United States Patent [19]

Bogle et al.

[11] Patent Number: 4,601,557
[45] Date of Patent: Jul. 22, 1986

[54] MOTION PICTURE CAMERA AUTOMATIC FOCUSING SYSTEM

[76] Inventors: Robert W. Bogle, 991 Skylark Dr., La Jolla, Calif. 92037; Gary Gero, 25191 Rivendell Dr., El Toro, Calif. 92630; Stephen L. Wald, 6509 Dennison St., San Diego, Calif. 92122

[21] Appl. No.: 763,949

[22] Filed: Aug. 8, 1985

Related U.S. Application Data

[63] Continuation-in-part of Ser. No. 510,686, Jul. 5, 1983, Pat. No. 4,534,629.

[51] Int. Cl.⁴ .............................................. G03B 3/00
[52] U.S. Cl. .................................. 352/140; 354/400; 354/401
[58] Field of Search ............... 352/140, 139; 354/400, 354/401

[56] References Cited

U.S. PATENT DOCUMENTS

| | | | |
|---|---|---|---|
| 4,103,309 | 7/1978 | Massa | 352/140 |
| 4,239,356 | 12/1980 | Freudenschuss et al. | 352/140 |
| 4,294,531 | 10/1981 | Shenk | 352/140 |
| 4,472,742 | 9/1984 | Hasegawa et al. | 352/140 |

Primary Examiner—Monroe H. Hayes
Attorney, Agent, or Firm—Baker, Maxham & Jester

[57] ABSTRACT

A focusing system for a variable focus lens of a motion picture camera includes a pulse modulator and a microwave transmitter mounted on a camera frame for generating a high frequency pulsed signal which is transmitted to a selected target which carries a reactive signal generator that is responsive to the first signal for coding and retransmitting the coded signal back to a receiver mounted on the camera frame, and a signal processor for determining the interval of travel of the signal and translating the interval into a distance-analog signal that is transmitted to a focusing motor for driving the focusing mechanism of the lens for focusing the lens at the distance determined by the signal. One alternate embodiment includes multiple reactive signal generators having distinctive signal responsive controls and portable remote transmitters for selectively switching to the selected ones of said reactive generators. Another embodiment includes a system for synchronizing the controls of multiple cameras for preventing interference between them.

16 Claims, 6 Drawing Figures

MOTION PICTURE CAMERA AUTOMATIC FOCUSING SYSTEM

CROSS REFERENCE TO RELATED APPLICATION

This application is a continuation-in-part of co-pending U.S. patent application No. 510,686, filed July 5, 1983, now U.S. Pat. No. 4,534,629.

BACKGROUND OF THE INVENTION

The present invention relates to automatic focusing systems for cameras and is particularly directed to a system for automatically focusing a movie camera.

The proper focusing of a camera is critical to the commercial production of motion pictures. Sharpness of focus is an important consideration in the production of realistic, commercially valuable films. Maintenance of a sharply focused image of the principal object of interest in a given scene, particularly when the principal object is in movement toward or from the camera, is a matter of particular challenge in cinematography. In this regard, the concept of depth of field is pertinent. Depth of field is a description of the range of distances an object of interest can be from the camera and remain in acceptably sharp focus without adjustment of the camera lens. Depth of field becomes smaller with increasing lens focal length, with larger lens aperture and with decreasing object distance to the camera. In commercial camera work, whether with film or video cameras, a tendency toward long focal length lenses operated with large aperture puts narrow limits on depth of field in usual practice and, accordingly, on the demands for precise adjustment of lens focus. Under these conditions it is essential that the lens be focused accurately. In the past, this has depended upon the skill of the camera operator or his assistant.

In an effort to overcome these problems, various automatic focusing systems for movie and still cameras have been proposed in the past. These prior art proposals have included ultrasonic ranging systems which have an ultrasonic transmitter for transmitting an ultrasonic acoustic pulse and a receiver for receiving a reflected pulse from the target and producing a signal indicative of the range and utilizing the signal for varying the focus of the lens. Such systems operate satisfactorily under certain situations, such as a single moving target, but present problems when there are multiple targets or when multiple moving targets or objects surround the principle target.

For example, many scenes for motion pictures involve "action" scenes involving several moving or stationary objects in addition to the principle target that may tend to confuse the camera focusing process.

Other systems have utilized light beams such as infrared light beams and the like for the generated signal. These systems suffer from the same problem as the ultrasonic systems in that target discrimination becomes a problem when multiple targets are within the scene of the principle target. One system employed is that of a light system which employs two small mirrors on either side of a prism. The prism reflects light rays to two identical photocells which are connected to a complex electronic comparator circuit. The scene before the camera is viewed by the mirrors, one of which is fixed at a preset angle to the prism and the other which vibrates to scan the scene. A small microprocessor measures the angle of the scanning mirror when the images coincide to calculate the camera-to-subject distance and sends a signal to a focusing motor which adjusts the lens accordingly.

Such autofocusing systems, however, are not foolproof in that they will always focus upon the nearest dominant object to the camera which may not always be the subject which the operator wishes to focus upon. For this reason, such autofocusing cameras are typically provided with a manual override so that the camera operator can deal with this situation. Thus, these systems are still dependent upon the skill of the cameraman to maintain the scene in focus.

Movie production becomes enormously expensive because of the necessity of retakes for various reasons, including the problem of incorrect focusing. This adds to the already tremendous costs of retakes and the like frequently required during movie production.

It is therefore desirable that a system be available which is selectively and highly discriminating as to targets for movie camera focusing.

The present system employs means for more particularly discriminating selected objects or targets within a scene to be photographed.

SUMMARY OF THE INVENTION

The present invention provides an improved system and method utilizing radar techniques for automatically focusing a camera.

In one aspect, an automatic focusing system according to the present invention includes a first radio signal generating and transmitting unit carried by the camera to be focused for generating and transmitting a first radio signal at a first frequency toward a photographic subject; a second radio generating and transmitting unit carried by the photographic subject and responsive to the first radio signal for generating and transmitting a second radio signal at a second frequency that is significantly higher than the first frequency; a microwave antenna carried by the camera for receiving the second radio signal and included in the first transmitting unit for radiating the first radio signal; a unit for measuring the time interval between the transmittal of the first radio signal and the receipt of the second radio signal and for generating a range signal that is representative of such measurement; and a unit carried by the camera for adjusting the focus of the camera in response to the range signal.

The microwave antenna preferably includes a transmitter port coupled to the first transmitting unit for passing the first radio signal from the first transmitting unit; a receiver port; a first waveguide section dimensioned for passing radio signals at both the first and second frequencies and connected to the transmitter port, whereby the first radio signal is passed from the first transmitting unit into the first waveguide section; a horn section coupled to the first waveguide section for radiating the first radio signal passed from the first transmitting means and for receiving the second radio signal; and a second waveguide section dimensioned for passing radio signals of the second frequency and for attenuating radio signals of the first frequency and connected between the receiver port and the first waveguide section for passing the second radio signal received by the horn section to the receiver port while isolating the receiver port from the first radio signal.

In another aspect of the present invention, a system for automatically focusing a camera having a predetermined lens is characterized by a unit carried by the camera for adjusting the focus of the camera in response to the range signal that includes an analog-to-digital converter for converting the analog range signal to a digital range signal; a digital memory for providing predetermined focusing signals for adjusting the focus of the predetermined lens in response to predetermined values of the digital range signal; and apparatus responsive to the focusing signals for adjusting the focus of the camera lens. Preferably the digital memory is interchangeable to correspond to the predetermined lens used with the camera.

In still another aspect of the present invention, the automatic focusing system is characterized by a unit for maintaining the existing value of the range signal when no second radio signal is received between successive transmittals of the first radio signal.

Additional features of the present invention are described in relation to the description of the preferred embodiments.

DESCRIPTION OF PREFERRED EMBODIMENTS

Figure 1:
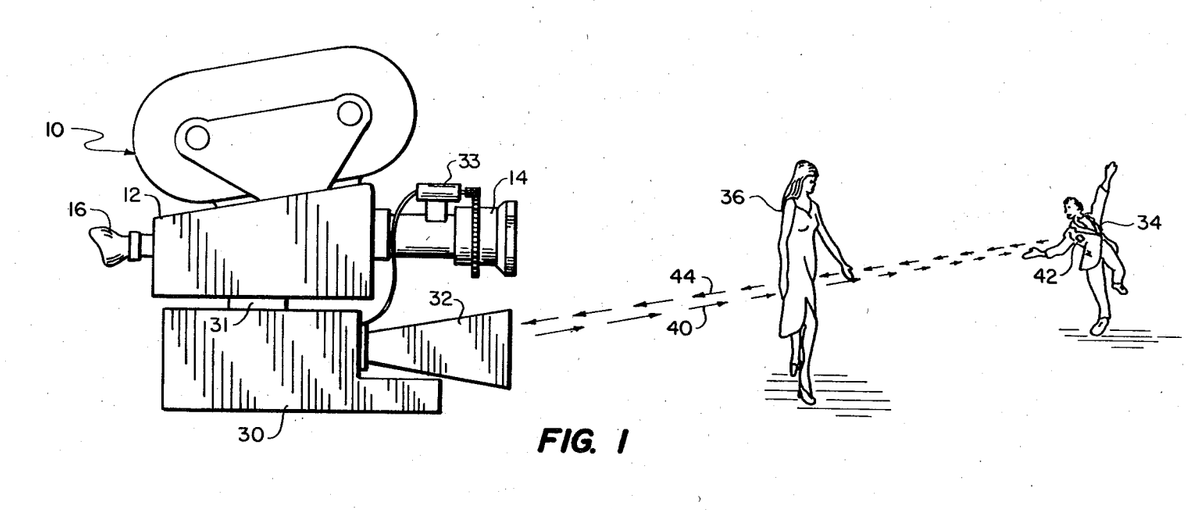
FIG. 1 illustrates the use of the automatic focusing system and method of the present invention.

Referring to FIG. 1, a camera equipped with a focusing system in accordance with the invention designated generally by the numeral 10 includes a housing 12 having a focusing lens system 14 mounted on the forward or front end thereof and a view finder 16 on the side of the housing 12 for framing the subject. An automatic focusing system 30 is commonly mounted on a support 31 with the housing 12 and includes a sending and receiving microwave antenna 32 for establishing the range or distance to the selected object or target and a servo motor 33 coupled to the lens system 14 for controlling the focus of the lens 14 in accordance therewith.

For the purpose of better illustrating the operation of the camera and its automatic focusing system, the camera is illustrated as filming a scene having a plurality of moving figures including a primary photographic subject 34 with a more dominant subject 36 dominating in both position and size. For the purposes of illustration it is assumed that the figures are in motion with the primary photographic subject 34 being the primary focus of attention. For this reason, the primary focus of the camera will be predominantly on this FIG. 34 which in the illustrated scene is overshadowed by a secondary FIG. 36.

In accordance with the primary aspect of the system, the focusing system 30 generates and transmits a first radio signal 40 consisting of a sequence of high frequency short time duration pulses which are transmitted in a direction toward the scene to be shot from the antenna 32. The first radio signal 40 is received by a miniature transponder 42 mounted on or carried in the clothing of the principal photographic subject 34. The transponder 42 responds to the first radio signal 40 by generating and transmitting a second radio signal 44 which is distinctive from the first radio signal 40. The transponder 42 functions like a transponder in a radar system. The second radio signal 44 is received by the antenna 32 and its associated receiving system and processed in a microprocessor in the focusing system 30 to measure the time interval between the transmittal of the first radio signal 40 and the receipt of the second radio signal 44. The microprocessor translates the time interval measurement into a range signal which represents the distance between the lens and the primary photographic subject 34. This range signal is then utilized for causing the servo motor 33 to adjust the lens 14 to the proper focus. The focusing system 30 acts somewhat in the manner of a ranging radar with the operation being on the order of between from about 3 meters to 100 meters or more depending on the focusing requirements of the lens in use.

The present system can be incorporated in either film or video cameras inasmuch as both utilize similar lens systems with similar requirements for focusing. It is understood that the illustrated camera 12 includes the usual shutter control, light control and other necessary controls which will not be specifically described herein.

Figure 2:
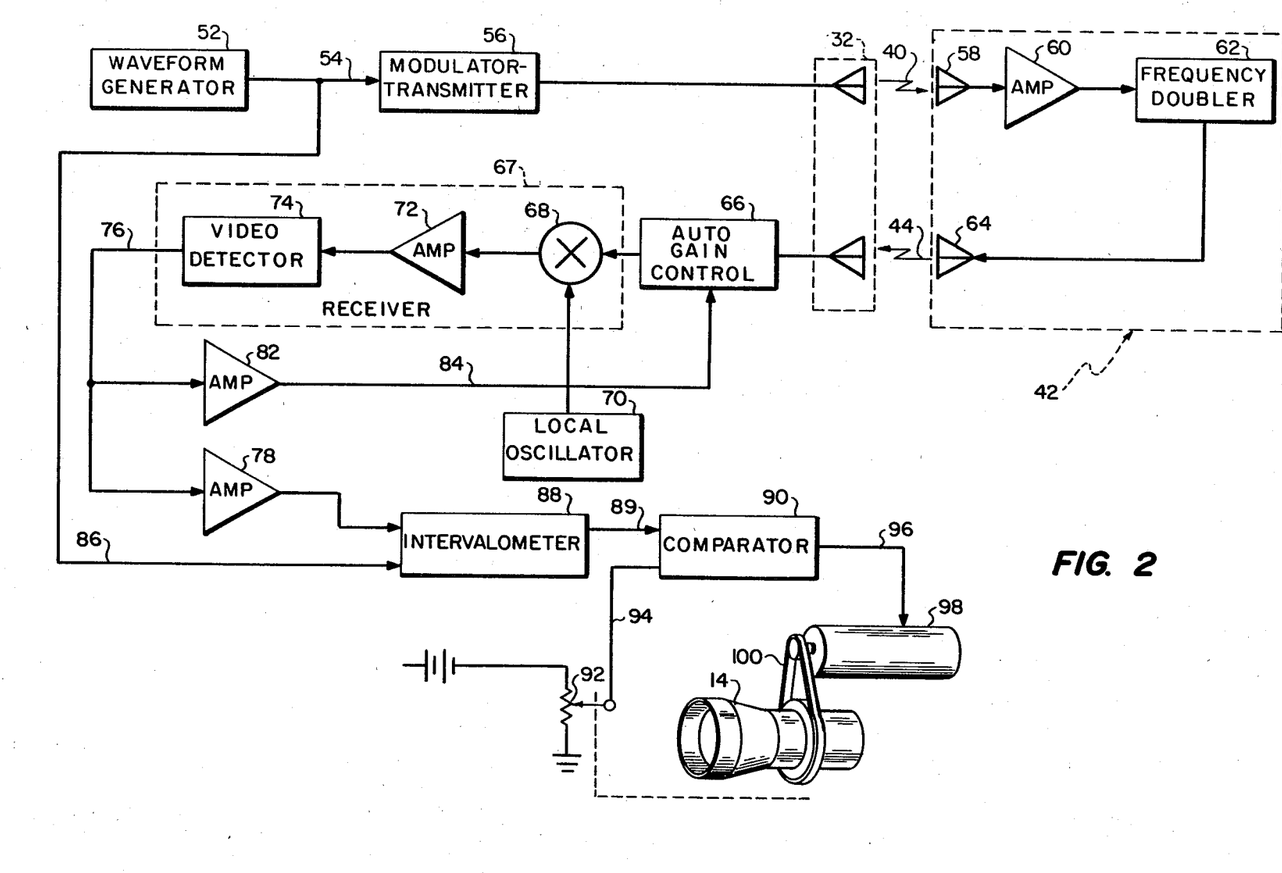
FIG. 2 is a block diagram of one preferred embodiment of the system of the present invention.

Referring to FIG. 2, the system includes a waveform generator 52 which preferably generates pulses on the order of about 10 nanoseconds in length at about a 100 kilohertz repetition rate, with the pulses being transmitted by a conductor 54 to a modulator-transmitter 56. The modulator-transmitter 56 produces pulses of high frequency (e.g. microwave) radio energy whose duration and repetition rate is determined by the waveform generator 52. Pulses of such short duration are desirable because of the short distances of operations. This allows the transmission of a particular pulse to be completed before it is received back at the camera. In essence the signal must be at least as short as the minimum time delay for the round trip. It is noted that the radio waves travel at the speed of light.

A suitable range of frequency would be on the order of about 10.5 GHz to about 21 GHz. The frequency of about 10.5 GHz might be selected for such a system because it is infrequently used for terrestrial communication links, and accordingly, to facilitate FCC licensing. Also, the propagation distances of interest are of such short range that atmospheric absorption losses within this frequency band are not a problem. The modulator-transmitter 56 transmits the first radio signal 40 by way of the antenna 32 and such signal 40 is received by the transponder 42.

The transponder 42 carried by the primary photographic subject 34 is a miniature electronic device on the order of the size of a pack of cigarettes or somewhat similar. The transponder includes an antenna 58 which receives the signal and amplifies it through an amplifier 60 and codes it by doubling the frequency to generate the second radio signal. The received first radio signal is amplified by the amplifier 60 and fed into a frequency doubler 62, which doubles the frequency to 21 GHz retransmits it back through an antenna 64 as the second radio signal 44. Other forms of coding may be utilized.

The second radio signal 44 is received by the antenna 32 and fed through an attenuator 66 for automatic gain control of the signal.

The received second radio signal is then demodulated in a receiver 67 by first combining it in a mixer 68 with a signal from a local oscillator 70 to provide the received signal at an intermediate frequency. The signal from the mixer 68 is then amplified by an amplifier 72 and transferred through a video detector 74. The detected signal is then carried by a conductor 76 and amplified in an amplifier 78 before being fed into a intervalometer 80. The detected signal also is amplified by an amplifier 82 and, via line 84, is utilized as an automatic gain control signal for the automatic gain control 66 which includes the PIN diode attenuator.

The intervalometer 88 measures the time difference between the receipt of the second signal from the amplifier 78 and a signal by way of conductor 86 from the transmitter for establishing a time between the transmittal of the first radio signal 40 and the receipt of the second radio signal 44 from the primary photographic subject 34. The intervalometer generates a range signal, such as a proportional analog voltage, that changes with the range from the lens 14 to the primary photographic subject and provides the range signal by way of a conductor 89 to a comparator 90 which compares this signal to a signal that may be designated a lens focus signal from a potentiometer 92 or other suitable signal or position determining means by way of line 94 for generating a difference signal or a signal proportioned to the difference between the two signals. The comparator 90 responds to any difference signal by generating a focusing signal which is transmitted by way of conductor 96 to a servo motor 98, which is coupled by a gear drive mechanism 100 for driving the focusing ring of the lens 14. This system provides a continuous automatic monitoring and focusing of the lens system 14 of the camera in response to movement of the primary photographic subject which carries the transponder 42.

The modulator-transmitter 56 may be obtained on special order from Varian Associates in San Mateo, Calif. The operating frequency of the modulator-transmitter should be in the range of from 10 to 36 GHz. The pulse length is on the order of 10 nanoseconds or less. Such short-pulsed high radio frequencies are required to permit a reasonable number of radio frequency cycles within the pulse in order to define a realistic radio frequency. Also, microwave frequencies will permit the use of a physically small antenna which demonstrates significant gain and narrow beam width. The pulse repetition rate can be much higher than normal radar systems because of the short range. Such high repetition rate can compensate for short pulses in terms of average power which affects radar sensitivity. The components of the system are constructed of solid state components.

The transponder 42 is of a monolithic construction with simple antennas 58 and 64 such as a printed circuit type. The transponder 42 includes a receiving antenna 58, amplifier 60, frequency doubler 62 and a transmitting antenna 64. It receives the pulses, amplifies them, doubles the radio frequency and re-radiates the second radio signal 44 on the antenna 64. The size of the transponder 42 is of such order that it can be readily concealed in the outer clothing disguised as jewelry, or other items such as a belt buckle, sheriff's badge, or the like. Such devices can be obtained on special order from Honeywell of Santa Barbara, Calif.

Figure 3:
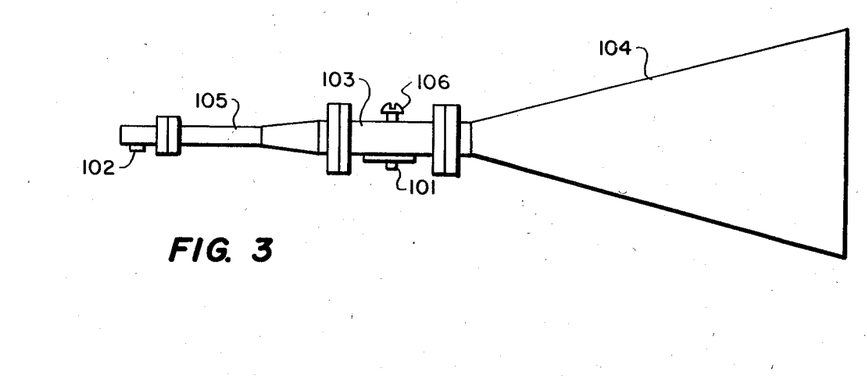
FIG. 3 illustrates the construction of the microwave antenna included in the system of FIG. 1.

The antenna 32 is a dual-frequency antenna having a rectangular horn antenna, as shown in FIGS. 1 and 3. The antenna 32 includes a transmitter port 101, a receiver port 102, first waveguide section 103, a horn section 104 and a second waveguide section 105.

The transmitter port 101 is coupled to the modulator-transmitter 56 for passing the first radio signal from the modulator-transmitter 56.

The first waveguide section 103 is dimensioned for passing radio signals at both 10.5 and 21 GHz and is connected to the transmitter port 101, whereby the 10.5 GHz radio signal is passed from the modulator-transmitter 56 into the first waveguide section 103. The horn section is coupled to the first waveguide section 103 for radiating the 10.5 GHz radio signal and for receiving the 21 GHz radio signal from the transponder 42.

The second waveguide section 105 is dimensioned for passing radio signals of 21 GHz and for attenuating radio signals of 10.5 GHz and connected between the receiver port 102 and the first waveguide section 103 for passing the 21 GHz radio signal received the horn section 104 to the receiver port 102 while isolating the receiver port 102 from the 10.5 GHz radio signal from the modulator-transmitter 56.

The gain of the antenna 32 is typically 20 dB at X-band and 24.5 dB at K-band. Matching is improved through the use of an adjustable stub 106, as shown in FIG. 3. To eliminate residual 21 GHz second-harmonic and higher frequency signals—generated by the transmitter-modulator 56—from entering the receiver, a Model FBP-1014 band-pass filter supplied by Western Microwave, is connected between the transmitter-modulator 56 and the transmitter port 101. Received 21 GHz signals, entering the antenna horn section 104, pass through the first waveguide section 103 without attenuation, thence through the second waveguide section 105 without substantial attenuation. The length of the second waveguide section 105 was selected to provide 100 dB of isolation from the 10.5 GHz radio signals from the transmitter-modulator 56.

Figure 4:
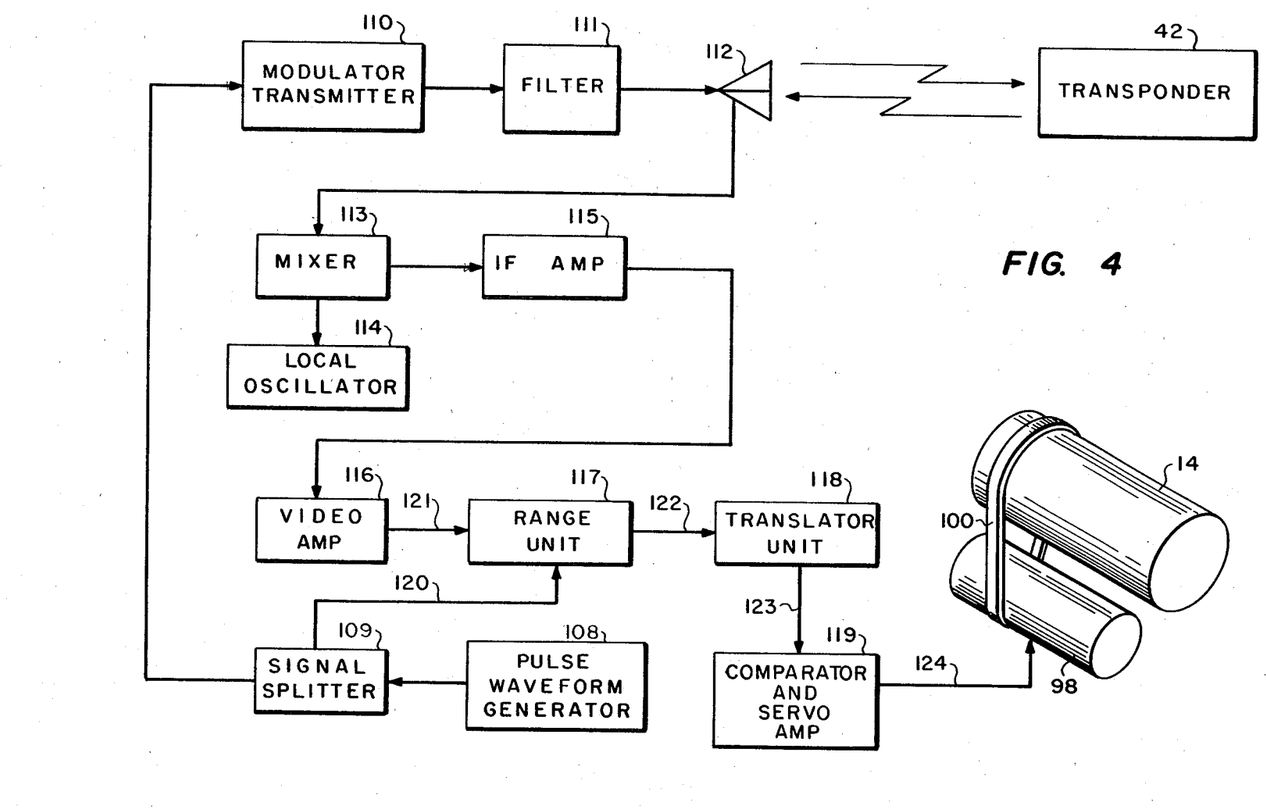
FIG. 4 is a block diagram of an alternative preferred embodiment of the system of the present invention.

An alternative preferred embodiment of the automatic focusing system of the present invention is described with reference to FIGS. 4, 5 and 6. Referring to FIG. 4, the system includes a transponder 42, a pulse waveform generator 108, a signal splitter 109, modulator-transmitter 110, a filter 111, a microwave antenna 112, a mixer 113, a local oscillator 114, an intermediate frequency (IF) amplifier 115, a video amplifier 116, a range unit 117, a translator unit 118, a comparator and servo amplifier circuit 119, a servo motor 98 and a gear drive mechanism 100.

The pulse waveform generator 108 generates a pulsed waveform that is provided by the signal splitter 109 to both the modulator transmitter 110 and the range unit 117. The modulator-transmitter 110 modulates the pulsed waveform for transmission and provides a radio signal at an X-band frequency of 10 GHz to the microwave antenna 112, via the filter 111, which attenuates any higher harmonics of the 10 GHz radio signal that may be present in the signal provided by the modulator-transmitter 110. The microwave antenna 112 radiates the 10 GHz radio signal toward the primary photographic subject carrying the transponder 42.

The transponder 42 responds to receipt of the 10 GHz radio signal by doubling the frequency to generate a 20 GHz radio signal in the K-band and transmitting the same.

The microwave antenna 112 receives the 20 GHz radio signal from the transponder 42 and provides such signal to the mixer 113. The mixer 113 mixes the received signal from the antenna 112 with a signal from the local oscillator 114 to provide the received signal at an IF frequency to the IF amplifier 115. The video amplifier 116 is connected in series with the output of the IF amplifier 115 and provides a return signal on line 121 to the range unit 117.

The range unit 117 measures the time interval between the transmittal of the 10 GHz radio signal and the receipt of the 20 GHz radio signal by processing the return signal on line 121 and a transmit signal received on line 120 from the pulse waveform generator 108 via the signal splitter 109. The range unit 117 generates a range signal onto line 122 that is representative of such measurement.

The translator unit 118 processes the range signal on line 122 to provide a focusing signal on line 123 to the servo amplifier 119. The servo amplifier 119 responds to the focusing signal on line 123 by providing a drive signal on line 124 to drive the servo motor 98 to adjust the focus of the lens 14 via the focusing ring drive mechanism 100.

The pulse waveform generator 108 includes a Picopulse Pulse Labs Model 2000-03 pulse generator. Output pulses are generated by the discharge of a 50 ohm delay line through an avalanche transistor and a 50 ohm load. As used in the system, a 140-inch long delay line produces pulses of 36 nanosecond duration. The repetition rate of the pulse generator is adjusted to 100 KHz. The pulse rise and fall times are less than 500 picoseconds. The nominal 50 volt output pulse is reduced with a 20 dB HP 33340C attenuator and subsequently divided into two five volt amplitude channels with a Merrimac Type PD-20-17 signal splitter. One of these channels drives the modulator/transmitter and the other produces the initial trigger required by the range-measuring unit.

The modulator/transmitter 110 is a Type VXC95435, manufactured by Varian's Solid State Microwave Division. It includes an impedance-matching amplifier and bias supply (the modulator), a 20 GHz IMPATT RF oscillator (the transmitter), an output circulator and a DC-to-DC inverter. The output of the modulator/transmitter produces a 3.5 watt peak power pulse at X-band. The inputs required are a five volt positive keying pulse and 24 volt DC power.

The antenna 112 is a dual-frequency antenna having a rectangular horn antenna, as shown in FIGS. 1 and 4. The antenna 112 includes a transmitter port 101, a receiver port 102, first waveguide section 103, a horn section 104 and a second waveguide section 105.

The transmitter port 101 is coupled to the modulator-transmitter 56 for passing the first radio signal from the modulator-transmitter 56.

The first waveguide section 103 is dimensioned for passing radio signals at both 10 and 20 GHz and is connected to the transmitter port 101, whereby the 10 GHz radio signal is passed from the modulator-transmitter 56 into the first waveguide section 103. The horn section is coupled to the first waveguide section 103 for radiating the 10 GHz radio signal and for receiving the 20 GHz radio signal from the transponder 42.

The second waveguide section 105 is dimensioned for passing radio signals of 20 GHz and for attenuating radio signals of 10 GHz and connected between the receiver port 102 and the first waveguide section 103 for passing the 20 GHz radio signal received the horn section 104 to the receiver port 102 while isolating the receiver port 102 from the 10 GHz radio signal from the modulator-transmitter 56.

The gain of the antenna 112 is 20 dB at X-band and 24.5 dB at K-band. Matching is improved through the use of an adjustable stub 106, as shown in FIG. 4. To eliminate residual 21 GHz second-harmonic and higher frequency signals—generated by the transmitter-modulator 56—from entering the receiver, a Model FBP-1014 band-pass filter 111 supplied by Western Microwave, is connected between the transmitter-modulator 56 and the transmitter port 101. Received 20 GHz signals, entering the antenna horn section 104, pass through the first waveguide section 103 without attenuation, thence through the second waveguide section 105 without substantial attentuation. The length of the second waveguide section 105 was selected to provide 100 dB of isolation from the 10 GHz radio signals from the transmitter-modulator 56.

The transponder 42 is constructed as described above with reference to FIG. 2.

The mixer 113 is an RHG Electronics Model DMS 21 J05GK. The local oscillator 114 is a Central Microwave Model 610 local oscillator. The IF amplifier is an RHG Electronics Model ICL 750-30H. The video amplifier is a Comlinear Corporation Model E103N. The bandwidth of the IF amplifier 115 is a nominal 500 MHz and provides a logarithmic response over a 65 dB range. The video amplifier 116 has a DC to 150 MHz bandpass. The IF amplifier 115 includes a second detector. The 26 dB gain of the video amplifier 116 produces a signal of sufficient amplitude for the range unit 117 to detect.

The range unit 117 accepts a "transmit" signal on line 120 from the pulse waveform generator 108 and a "return" signal on line 121 from the video amplifier 116 and provides a range signal on line 122 having a voltage that is linearly proportional to the time interval between them. Since the characteristics of the Varian modulator/transmitter 110, together with the delay in the interconnecting cables, produces a delay of approximately 80 nanoseconds between the rise of the keying pulse and the rise of the output RF pulse, an offset bias is provided at the output of the range unit 117 to compensate for this fixed delay.

The basic scheme of the range unit 117 is one in which the start of the two independent ramp (sawtooth waveform) signals (i.e., uniformly increasing with time) are triggered respectively by the start of the transmit signal pulse on line 120 and the start of the return signal radar echo pulse received on line 121. At some time after the initiation of these two ramp signals, the range unit 117 samples the voltage difference between the two ramp signals and holds such difference, which is proportional to the interpulse time delay, for presentation at the output of the circuit as a DC (or slowly varying) voltage range signal on line 122. By expressing the time interval as the difference between the simultaneous voltages of the two ramp signals generated by identical circuits, non-linearities due to temperature effects, component aging or other related matters are practically eliminated. Furthermore, since the duration of the two ramp signals can be long compared to the interpulse interval, the information-bearing voltage difference can be sampled at a time which is sufficiently delayed form the time of initiation that the effect of transient ringing can be avoided.

Four time intervals must be taken into account. The first is the radar delay interval which is the value to be determined, i.e., from approximately 10 to 1000 nanoseconds. The second interval of importance is the radar interpulse interval which is the inverse of the radar repetition rate. This interval is a nominal ten microseconds and only has bearing on the range unit 117 insofar as the sampling functions of the latter must be complete before the next transmit pulse is generated. The third interval of importance is the delay between the start of the second ramp signal initiated by the return signal radar echo pulse and the time at which the sample is taken of the voltage difference between the first and second ramp signals. A nominal value of 500 nanoseconds has been selected for this delay. Finally, a ramp duration of two microseconds has been selected to provide the maximum slope in volts per microsecond which is consistent with TTL (five volt) operating levels and the maximum system operating delay of one microsecond.

Figure 5:
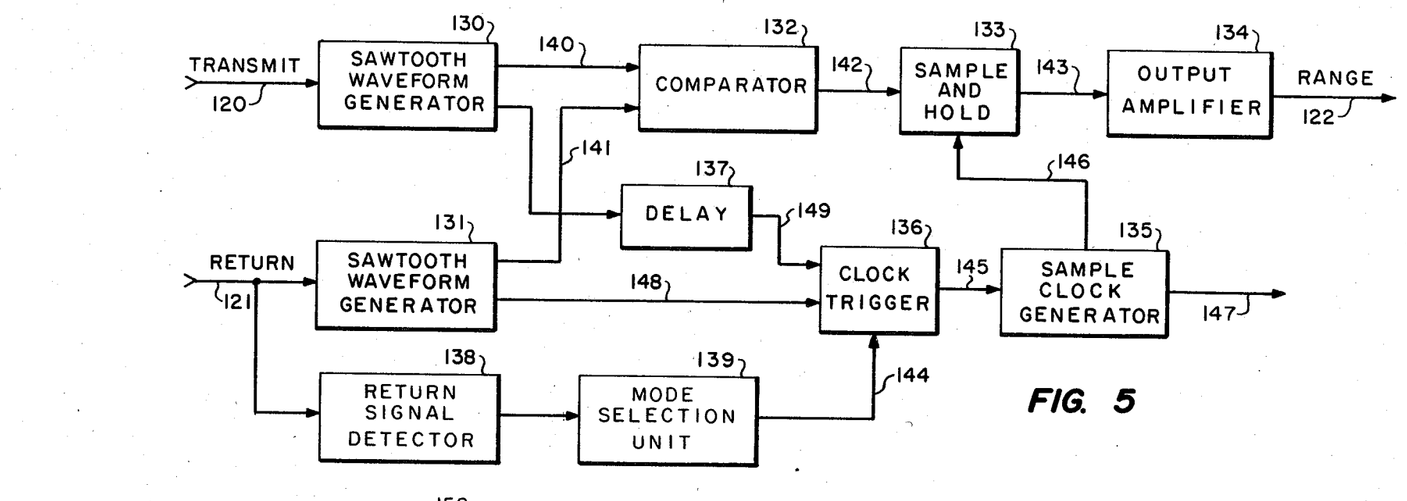
FIG. 5 is a block diagram of the range unit included in the system of FIG. 4.

Referring to FIG. 5, the range unit 117 includes a first sawtooth waveform generator 130, a second sawtooth waveform generator 131, a comparator 132, a sample and hold unit 133, an output amplifier 134, a sample clock signal generator 135, a clock trigger unit 136, a delay unit 137, a return signal detector unit 138 and a mode selection unit 139.

The first sawtooth waveform generator 130 is triggered in response to each transmit signal pulse on line 120 to generate a first ramp signal having a given linear slope on line 140. The second sawtooth waveform generator 131 is triggered in response to each return signal pulse on line 121 to generate a second ramp signal having the same given linear slope on line 141.

The comparator 132 measures the difference between the value of the first ramp signal on line 140 and the value of the second ramp signal on line 141 and provides a difference signal on line 142 that is representative of the measured difference. At a predetermined time after the receipt of the return signal by the second sawtooth waveform generator 131 on line 121, the sample and hold unit 133 samples the difference signal on line 142 and holds the value of the sampled signal on line 143 to the output amplifier 134, which conditions the signal on line 143 to provide the range signal on line 122. As a result the range signal on line 122 has a value that is representative of the measured difference between the value of the first ramp signal on line 140 and the value of the second ramp signal on line 141 at a predetermined time after receipt of the return signal on line 121.

The range unit of FIG. 5 may be selectively operated in one of three different modes, as determined by the manual setting of the mode selection unit 139. These three modes are a "normal" mode, a "lock" mode and an "auto/lock" mode.

In the normal mode, the mode selection unit 139 continuously provides an enabling signal on line 144 to the clock trigger unit 136. The function of the clock trigger unit 136 is to provide a clock trigger signal on line 145 for triggering the sample clock generator 135 to provide a sample clock signal on line 146 to the sample and hold unit 133 and a sample clock signal on line 147 to the translator unit 118. The sample and hold unit 133 samples the difference signal on line 142 in response to the sample clock signal on line 146 and holds the value of the sampled signal on line 143 until the next clock sample clock signal is provided on line 146.

The clock trigger unit 136 provides the clock trigger signal on line 145 in response to the first to be received of either a pulse on line 148 derived from the return signal received by the second sawtooth waveform generator 131 from line 121 or a pulse on line 149 derived from the transmit signal pulse received by the first sawtooth waveform generator 130 from line 120 and then delayed by the delay unit 137 by a predetermined time corresponding to at least the hyperfocal distance of the lens 14.

The range unit is operated in the lock mode when it is desired to lock the lens at its then existing focal length setting, such as in the event the transponder 42 (and thereby the primary photographic subject 34) is momentarily obscured from view by the system antenna 112. The criterion for the "lock" function is the amplitude of the return signal on line 121. When the mode selection unit 139 is placed in the lock mode an inhibiting signal is provided on line 144 to the clock trigger unit 136, thereby inhibiting the triggering of the sample clock generator 135 and maintaining the range signal on line 122 at its existing value.

When the mode selection unit 139 is placed in the auto/lock mode, an inhibiting signal is provided on line 144 to the clock trigger unit 136 until a return signal pulse on line 121 of at least a predetermined minimum amplitude is detected by the return signal detector 138, and then an enabling signal is provided on line 144. The relative timing of the signals provided to the clock trigger unit 136 on lines 144, 148 and 149 is such that the enabling signal on line 144 is received prior to either of the signals on lines 148 and 149 unless the selected photographic subject is beyond the hyperfocal distance of the lens 14. Accordingly, whenever no second radio signal is received between successive transmittals of the first radio signal, the clock trigger unit is inhibited and the existing value of the range signal on line 122 is maintained.

The transmit signal pulse on line 120 corresponds to the start of the radar interpulse interval; and the return pulse on line 121 corresponds to the end of this interval. The interpulse interval is proportional to the distance to the transponder 42 from the camera focusing system 10.

The first and second sawtooth waveform generators 130, 131 respectively include one-shot multivibrators which supply identical switching waveforms to a Model MDA 2369 dual matched pair of high speed, emitter-coupled transistors.

Each transistor has associated with it a capacitor and a zener diode. During the non-measurement portion of the cycle (transistor on), the reference current flows through the transistor and Vc will be about 0.3 volts. Initiation of a measurement interval turns the transistor off, shunting current to the capacitor. The capacitor will charge at a constant rate until the zener breakdown voltage (11 volts) is reached. At this point, the output voltage remains constant and the reference current flows through the zener. The zener assures that the current source is never forced out of its compliance range, eliminating problems with settling or recovery times.

The collector terminals are respectively connected to separate transistors of a dual constant-current source that includes a Model IT 130 matched transistor pair (IT130), driven by a precision voltage reference. Each transistor provides a constant current flow regardless of its impressed voltage. Since the base-to-emitter voltage actually experiences some temperature drift, an external diode is used which essentially cancels the base-to-emitter voltage term. The precision voltage reference is an LM 336 integrated circuit, which, when trimmed by the 10K potentiometer, has a temperature coefficient of less than 35 ppm/degree C. Since both transistors are driven by the same voltage, the only current imbalance is that which results from mismatch of the pair. Since the principal concern is with imbalance in the charge constants, I and C, and difference between the two capacitors must be compensated. In this design, the choice was made to match the charge constants by unbalancing the currents to compensate for capacitor differences. However, capacitors must be closely matched, since any current imbalance affects the common mode sensitivity of the circuit.

The switching transistors are biased up by one diode drop (0.6 volts) from −5 volts to guarantee that the TTL driving signals will turn them off completely. Taking into account the compliance limit of the current sources, the voltage range for the capacitor charge is from about −4 volts to +11 volts, with the zener diode selected to clamp at +7 volts. This allows for a nominal 10 volt range. The I and C combination is presently set for 5 volts/microsecond, so the maximum measurement period is two microseconds. One microsecond corresponds to 500 feet of range which is well beyond the intended active operating range of the camera focusing system. This period allows one microsecond for the actual range delay and one microsecond for the measurement process.

The sample and hold unit 133 includes a Model HTC-0500, a high-speed sample-and-hold device and a 600 nanosecond one-shot. The unit is normally in the "hold" mode and switches briefly to the "sample" mode for each measurement update at approximately a 1 KHz rate as controlled by the sample clock signal on line 146. The sample period starts at the beginning of the return signal pulse charge cycle, and continues for 600 nanoseconds. During this interval, the signal on line 143 tracks any variations in the difference signal on line 142. When the sample and hold unit 133 switches back to the hold mode, the signal on line 143 is held at the value at that time and remains constant until the next measurement.

The output amplifier 134 provides for the output zero and scaling adjustments required for interface with the following translator unit 118. The zero (or offset) adjustment includes the important compensation for the earlier-mentioned delay occasioned by functions in the modulator/transmitter 110. The output amplifier 134 gain adjustment is placed at the input of the amplifier stage to isolate the effects of gain adjustment from offset adjustments.

At this point, mode selection is further discussed. To accommodate an operating situation in which the selected photographic subject 34 bearing the transponder 42 may momentarily be obscured from the antenna 32 by an object which blanks the return of the second radio signal, the operator operates the mode selection unit 139 to place the range unit in the auto/lock mode, wherein the signal on line 122 and thereby the camera focus are locked at values corresponding to the last range that was detected. When the antenna 32 again picks up the returned second radio signal, the range unit automatically switches into the normal automatic tracking routine provided in the normal mode of operation.

Alternatively, the operator can also switch the mode selection unit 139 to place the range unit in the lock mode, wherein the range signal on line 122 and thereby the camera focus are maintained at their existing values independently of the radar operation of the focusing system.

In the normal mode, the camera focus will default to the hyperfocal distance in the absence of returned second radio signal. This feature allows for situations in which the subject approaches from (or recedes to) a distance which is beyond the radar system operating range, which equals the hyperfocal distance of the camera.

The pulses on lines 148 and 149 to the clock trigger circuit are provided by the respective one-shot multivibrators in the second and first sawtooth waveform generators 131 and 130 respectively. The delay provided by the delay unit 137 is adjusted so that the pulse on line 149 derived from the transmit pulse will not occur until well after a pulse on line 148 derived from an actual return signal pulse on line 121 should be expected with the hyperfocal distance of the camera lens.

The time-constants of the respective one-shot multivibrator outputs have been adjusted so that the delayed pulse on line 149 will always end before that of the pulse on line 149 derived from the return signal. Accordingly, the delayed pulse on line 149 will be blanked when a true return is present, thus preventing a double-triggering of the sample clock generator 135. The clock trigger unit 136 responds to the delayed pulse on line 149 only if no second radio signal is received by the antenna within a predetermined time after transmittal of the first radio signal corresponding to at least the hyperfocal distance of the camera lens. Since this delayed pulse is timed to occur at a later time than the latest expected true return, the range signal will represent the hyperfocal distance of the camera lens.

The voltage-level output of the range signal on line 122 from the range unit 117 is linearly proportional to the distance to the transponder 42 as measured by the radar elements of the system. However, it is characteristic of lenses that the position of the lens (usually the rotational position of the lens focusing ring) is inversely proportional to object distance (range). In the case of complex lenses, typical of modern designs including zoom lenses, there may also be deviations from a simple inverse relationship. To accommodate the difference between the proportional and inversely proportional relationship, the function of a cam must be invoked, with a specific functional cam being required for each different lens type. In this preferred embodiment of the system of the present invention, this cam function is provided through the application of digital processing by the translator 118.

Figure 6:
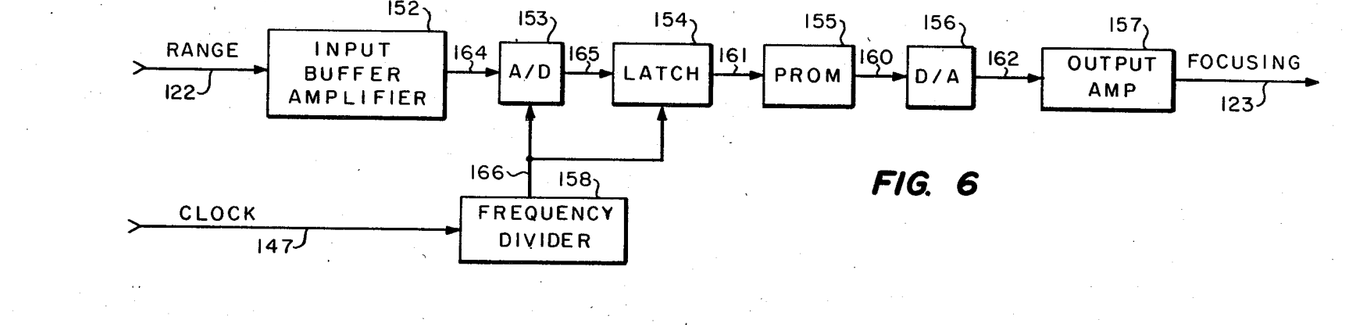
FIG. 6 is a block diagram of the translator unit included in the system of FIG. 4.

Referring to FIG. 6, the translator unit includes an input buffer amplifier 152, and analog-to-digital (A/D) converter 153, a latch 154, a programmable read-only memory (PROM) 155, a digital-to-analog (D/A) converter 156, an output amplifier 157 and a divider 158.

In brief, the range-proportional analog range signal on line 122 from the range unit 118 is first digitized by the A/D converter 153, then processed through a stored digital look-up memory in the PROM 155 that is specific to the lens in use, and which produces an output signal on line 160 that corresponds to a (generally) inverse relationship to its input signal on line 161. The D/A converter 156 then re-converts this processed digital output signal on line 160 to an analog signal on line 162 and the output amplifier 157 conditions this analog signal on line 162 to provide a focusing signal on line 123 to the servo amplifier 119 (FIG. 4). The physical form of the PROM 155 is a typical integrated-circuit chip, which is interchangeable and may be replaced in the translator unit to correspond to the particular lens system 14 that is being used. The contents of the PROM 155 are derived from careful measurements of each individual lens in which electrical signals are recorded for each of a series of optically-determined focus positions for various object distances. For redundancy, these distances can be made to coincide with the focus ring markings if the latter agree closely with actual object distance. In practice, a limited, but adequate, number of these measurements is made, a smooth graphical (or computer curve-fitted) interpolation of the points is constructed and all intermediate points taken from this construction.

By its nature, digital processing produces a set of step-wise, rather than continuous, variations. However, by selecting a suitable large number of steps, an arbitrarily close approximation can be made to a continuous variable. In the system, a 10-bit PROM has been selected which provides 1023 steps (1024 values). Based on the determined hyperfocal distance of a sample 120 mm, 16 mm-format lens, a working maximum range of 40 meters was selected for the system. Accordingly, each of the 1023 steps in range is 0.0391 meters (1.54 inches) in extent. Tests with this lens show that smooth focusing is achieved—with an f2.2 stop—at ranges down to approximately two meters (6.56 feet).

The range signal on line 122 is buffered by a high input impedance, unity-gain, Model LM 308 operational amplifier circuit 152. The LM308 was selected for its stable DC characteristics which render zero offset and drift negligible. A 47 picofarad capacitor supplies the external frequency compensation required by the LM308.

The buffered range signal on line 164 is converted by a Model AD571 A/D converter 153 to a 10-bit digital word on line 165.

During the convert cycle, which lasts 25 microseconds, the A/D converter 154 output signal on line 165 tracks the conversion process. To avoid having these rapidly changing bit states "glitch" the final output signal, the digital word must be latched before conversion process begins. A Model 74LS374 latch 154 performs this function. Both the latch 154 and the A/D converter 153 are clocked by a signal on line 166 from the frequency divider 158 derived from the clock signal on line 147 provided by the sample clock generator 135 in the range unit of FIG. 5. The A/D converter 153 samples at a lower rate than the sample and hold unit 133. The transfer function itself resides as a look-up table. The PROM 155 provides this look-up table mapped to a specified transfer function corresponding to the lens characteristics in the form of address locations (range inputs) versus address contents (focus ring settings). The output of the PROM 155 on line 160 is an eight-bit-wide digital word. This output signal on line 160 is converted back to an analog signal on line 162 by a Model DAC80 D/A converter 156.

The output amplifier 157 inverts the D/A converter output signal on line 162 and provides the gain-set function.

Referring again to FIG. 4, the servo amplifier circuit 119 drives the servo motor 98 to bring the focus ring setting to match the range input. Generally, the servo amplifier circuit 119 includes a comparator circuit, a driver amplifier and a three-turn potentiometer which is used as a position feed-back source. The signal from the feed-back potentiometer is matched against the focusing signal on line 123 by the comparator circuit in the servo amplifier circuit 119. The output of this comparator circuit is provided to the driver amplifier which drives the servo motor 98 to a null position. This technique eliminates the need for linearity in the motor system and allows for optimization of the motor servo loop dynamics. It should be noted that any non-linearities in the feed-back potentiometer are calibrated out in the process of determining the exact values for the translator PROM 155. The servo motor 98 is mounted on the camera lens and actuates the lens focus ring through a spur and ring-gear combination. The ring gear is precision-machined to a tight clamped fit on the lens focus ring. The motor-to-gear ratio is 1:6.

The differential amplifier in the servo amplifier circuit 119 senses the difference voltage between the radar-generated range information and the signal from the position feed-back potentiometer and drives the servo motor to null this difference. A following amplifier stage provides additional gain. The gain of this stage is adjusted, in accordance with a selected value of feedback, to produce a maximum running rate for the servo motor 98 without tendency for overshoot.

We claim:
1. A method of automatically focusing a camera, said method comprising the steps of
  (a) generating a first radio signal and transmitting the first radio signal from the camera to be focused toward a photographic subject;
  (b) responding to said first radio signal by generating a second radio signal and transmitting the second radio signal from the photographic subject;
  (c) receiving the second radio signal at the camera;
  (d) measuring the time interval between the transmittal of the first radio signal and the receipt of the second radio signal and generating a range signal that is representative of said measurement; and
  (e) adjusting the focus of the camera in response to the range signal.

2. A method according to claim 1, for a camera having a predetermined lens, wherein the range signal generated by step (d) is an analog signal and wherein step (e) comprises the steps of
  (f) converting the analog range signal to a digital range signal;
  (g) providing predetermined focusing signals for adjusting the focus of the predetermined lens in response to predetermined values of the digital range signal; and
  (h) responding to the predetermined focusing signals by adjusting the focus of the camera lens.

3. A method according to claim 1, further comprising the step of
  (f) maintaining the existing value of the range signal when no second radio signal is received between successive transmittals of the first radio signal.

4. A method according to claim 1, further comprising the step of
  (f) providing a range signal representative of the hyperfocal distance of the lens when a second radio signal is not received prior to a predetermined time after transmittal of the first radio signal.

5. A system for automatically focusing a camera, said system comprising
  first radio signal generating and transmitting means carried by the camera to be focused for generating and transmitting a first radio signal at a first frequency toward a photographic subject;
  second radio generating and transmitting means carried by the photographic subject and responsive to said first radio signal for generating and transmitting a second radio signal at a second frequency that is significantly higher than the first frequency;

a microwave antenna carried by the camera for receiving the second radio signal and included in the first transmitting means for radiating the first radio signal;

means for measuring the time interval between the transmittal of the first radio signal and the receipt of the second radio signal and for generating a range signal that is representative of said measurement; and means carried by the camera for adjusting the focus of the camera in response to the range signal.

6. A focusing system according to claim 5, wherein the microwave antenna comprises a transmitter port coupled to the first transmitting means for passing the first radio signal from the first transmitting means;

a receiver port;

a first waveguide section dimensioned for passing radio signals at both the first and second frequencies and connected to the transmitter port, whereby the first radio signal is passed from the first transmitting means into the first waveguide section;

a horn section coupled to the first waveguide section for radiating the first radio signal passed from the first transmitting means and for receiving the second radio signal; and a second waveguide section dimensioned for passing radio signals of the second frequency and for attenuating radio signals of the first frequency and connected between the receiver port and the first waveguide section for passing the second radio signal received by the horn section to the receiver port while isolating the receiver port from the first radio signal.

7. A system according to claim 6, further comprising a filter connected between the first transmitting means and the transmitter port for attenuating any higher harmonics of the first frequency that are present in the first radio signal.

8. A focusing system according to claim 5, for a camera having a predetermined lens, wherein the adjusting means comprise means for converting the analog range signal to a digital range signal;

a digital memory for providing predetermined focusing signals for adjusting the focus of the predetermined lens in response to predetermined values of the digital range signal; and means responsive to the focusing signals for adjusting the focus of the camera lens.

9. A system according to claim 8, wherein the digital memory is interchangeable.

10. A focusing system according to claim 5, further comprising means for maintaining the existing value of the range signal when no second radio signal is received between successive transmittals of the first radio signal.

11. A focusing system according to claim 5, wherein the measuring system comprises a first sawtooth signal generator triggered upon each transmittal of the first radio signal for generating a first ramp signal having a given linear slope;

a second sawtooth signal generator identical to the first sawtooth signal generator and triggered upon each receipt of the second radio signal for generating a second ramp signal having said given linear slope; and means for measuring the difference between the value of the first ramp signal and the value of the second ramp signal at a predetermined time after receipt of the second radio signal and for generating as the range signal a signal having a value representative of said measured difference.

12. A system according to claim 5, wherein the measuring means provides a range signal representative of the hyperfocal distance of the lens when a second radio signal is not received prior to a predetermined time after transmittals of the first radio signal.

13. A system for automatically focusing a camera having a predetermined lens, said system comprising first radio signal generating and transmitting means carried by the camera to be focused for generating and transmitting a first radio signal toward a photographic subject;

second radio generating and transmitting means carried by the photographic subject and responsive to said first radio signal for generating and transmitting a second radio signal;

an antenna carried by the camera for receiving the second radio signal;

means for measuring the time interval between the transmittal of the first radio signal and the receipt of the second radio signal and for generating an analog range signal that is representative of said measurement; and means carried by the camera for adjusting the focus of the camera in response to the range signal, the adjusting means comprising means for converting the analog range signal to a digital range signal;

a digital memory for providing predetermined focusing signals for adjusting the focus of the predetermined lens in response to predetermined values of the digital range signal; and means responsive to the focusing signals for adjusting the focus of the camera lens.

14. A system according to claim 13, wherein the digital memory is interchangeable.

15. A system according to claim 13, further comprising means for maintaining the existing value of the analog range signal when no second radio signal is received between successive transmittals of the first radio signal.

16. A system for automatically focusing a camera, said system comprising first radio signal generating and transmitting means carried by the camera to be focused for generating and transmitting a first radio signal toward a photographic subject;

second radio generating and transmitting means carried by the photographic subject and responsive to said first radio signal for generating and transmitting a second radio signal;

an antenna carried by the camera for receiving the second radio signal;

means for measuring the time interval between the transmittal of the first radio signal and the receipt of the second radio signal and for generating a range signal that is representative of said measurement;

means carried by the camera for adjusting the focus of the camera in response to the range signal; and means for maintaining the existing value of the range signal when no second radio signal is received between successive transmittals of the first radio signal.

* * * * *